United States Patent [19]
Marrero

[11] Patent Number: 6,008,999
[45] Date of Patent: Dec. 28, 1999

[54] NON-ISOLATED BUCK CONVERTER WITH INPUT CURRENT STEERING

[75] Inventor: Joe Marrero, Menlo Park, Calif.

[73] Assignee: National Semiconductor Corporation, Santa Clara, Calif.

[21] Appl. No.: 09/131,155

[22] Filed: Aug. 7, 1998

[51] Int. Cl.$^6$ .......................... H02M 3/335; G05F 1/656
[52] U.S. Cl. ............................................. 363/21; 323/222
[58] Field of Search ..................... 323/222, 266, 323/269, 270, 273; 363/39, 40, 95, 97, 131

[56] References Cited

U.S. PATENT DOCUMENTS

| | | | |
|---|---|---|---|
| 3,106,672 | 10/1963 | Mills | 320/1 |
| 4,253,139 | 2/1981 | Weiss | 363/95 |
| 4,321,526 | 3/1982 | Weischedel | 323/286 |
| 4,618,919 | 10/1986 | Martin, Jr. | 363/21 |
| 4,692,851 | 9/1987 | Attwood | 363/16 |
| 4,768,141 | 8/1988 | Hubertus et al. | 363/16 |
| 5,038,263 | 8/1991 | Marrero et al. | 363/20 |
| 5,047,911 | 9/1991 | Sperzel et al. | 363/56 |
| 5,107,151 | 4/1992 | Cambier | 307/570 |
| 5,224,025 | 6/1993 | Divan et al. | 363/16 |
| 5,291,382 | 3/1994 | Cohen | 363/16 |
| 5,345,375 | 9/1994 | Mohan | 363/40 |
| 5,502,630 | 3/1996 | Rokhvarg | 323/222 |
| 5,619,404 | 4/1997 | Zak | 363/21 |
| 5,668,464 | 9/1997 | Krein et al. | 323/259 |
| 5,694,302 | 12/1997 | Faulk | 363/16 |
| 5,774,348 | 6/1998 | Druce et al. | 363/60 |
| 5,786,990 | 7/1998 | Marrero | 363/16 |

*Primary Examiner*—Matthew Nguyen
*Attorney, Agent, or Firm*—Limbach & Limbach L.L.P.

[57] ABSTRACT

A non-isolated buck converter with input and output current steering. The input current steering is connected across the input switching transistor and steers input current to the output when the switch is turned off, thereby preventing the input current from pulsating between on and off states. The output current steering is connected across the low-pass output filter and further steers the steered input current back to the input dc voltage source. This prevents the steered input current from adding to the normal output current and thereby producing a pulsating output current. The ratio of the output dc voltage to the input dc voltage is proportional to the switching duty cycle.

9 Claims, 4 Drawing Sheets

ABSTRACT CUT — BEGIN PAGE

NON-ISOLATED BUCK CONVERTER WITH INPUT CURRENT STEERING

BACKGROUND OF THE INVENTION

1. Field of the Invention

The present invention relates to DC-to-DC voltage converters, and in particular, to buck converters, and more particularly, to non-isolated buck converters.

2. Description of the Related Art

Voltage converters which convert one DC voltage to another are increasingly used due to their greater voltage conversion efficiency as compared to linear converters. Such converters are typically used to convert unregulated or regulated DC voltage to a different, and sometimes variable, regulated DC voltage at the output. Such converters are widely used in switch-mode DC power supplies and in DC motor drive applications. One common DC—DC converter topology is a buck converter which converts an input DC voltage to a lower output DC voltage and is sometimes called a step-down converter.

Referring to FIG. 1, a common buck converter topology includes an input filter capacitor Cin, a metal oxide semiconductor field effect transistor (MOSFET) Msw, a diode Dfw, an output inductor Lo and an output capacitor Co, all interconnected substantially as shown. The input DC voltage Vdc is filtered by the input capacitor Cin and provides an input DC current Iin. This input current Iin is periodically switched by the switching transistor Msw in accordance with a switching control signal Vc. The alternating on and off states of the switching transistor Msw define a duty cycle D and in accordance therewith provide a switched current Isw. When the switch Msw is turned on, the freewheeling diode Dfw is reverse-biased and, therefore, turned off; and the switched current Isw flows through the output filter inductor Lo as an output current Io which charges the output filter capacitor Co and powers the load Rload. As is well known in the art, the ratio of the output voltage Vo to the input voltage Vdc is equal to the duty cycle D (0<D<1).

When the switch Msw is turned off, the switched current Isw is zero. However, the output current Io through the inductor Lo cannot instantaneously decrease to zero. Therefore, the inductor current Io continues to flow through the loop formed with the load Rload and freewheeling diode Dfw as a diode current Id. The output capacitor Co provides additional charge to maintain the output voltage Vo across the load Rload.

Referring to FIG. 2, a significant problem with this type of buck converter is that of a pulsating input current Iin. The input current Iin flows during the on state of the switch Msw, but is zero during the off state. This pulsating input current Iin requires that the input capacitor Cin be large so as to handle the ripple current. Additionally, a filter is needed for reducing the electromagnetic interference (EMI) generated by the many high-magnitude signal components at the harmonic frequencies ("harmonics") of the pulsed input current Iin.

The output current Io, due to the low-pass nature of the output filter formed by the output inductor Lo and capacitor Co, is not a pulsating current. However, due to the linear ramping nature of the output current Io waveform (substantially triangular in shape), the output current Io still contains a substantial number of harmonics which can cause interference within the system (load Rload) which is being powered with this output voltage Vo.

One technique which has been used in a variety of ways to address the problems of pulsating currents and high harmonic contents is that of ripple steering. The basic principle behind ripple steering is that the input and output ripple currents are steered in such a way as to reduce or substantially eliminate pulsations in the currents, as well as filtering out much of the harmonic contents of such currents. Examples of ripple steering can be found in U.S. Pat. Nos. 5,038,263 and 5,786,990 (the disclosures of which are incorporated herein by reference).

However, whereas the buck converter topology of FIG. 1 is that of a non-isolated circuit where some form of DC connection exists (at least periodically) between the input and output terminals, the applications involving conventional ripple steering techniques have been in isolated circuit topologies where there is permanent DC isolation between the input and output terminals (e.g., via an isolation transformer). Accordingly, it would be desirable to have some forms of ripple steering for non-isolated buck converter topologies.

SUMMARY OF THE INVENTION

A non-isolated buck converter with current steering in accordance with the present invention uses ripple steering techniques in a non-isolated topology to eliminate pulsations in the input current and to reduce the harmonics content of the output current. This advantageously reduces EMI which would otherwise be generated at the input and output terminals of the converter.

In accordance with one embodiment of the present invention, a non-isolated buck converter with input current steering includes a switching circuit, an input current steering circuit and an output filter circuit. The switching circuit is configured to receive and periodically switch an input current at an input dc voltage in accordance with alternating on and off states which define a duty cycle and in accordance therewith provide a switched current. The input current steering circuit, which is connected across the switching circuit, is configured to steer the input current by conducting the input current when the switching circuit is in its off state and in accordance therewith provide a steered current. The output filter circuit, which is connected to the switching circuit and connected and magnetically coupled to the input current steering circuit, is configured to receive and filter the switched and steered currents and in accordance therewith provide an output dc voltage which, in accordance with the duty cycle, is less than the input dc voltage.

In accordance with another embodiment of the present invention, a non-isolated buck converter with input and output current steering includes a switching circuit, an input current steering circuit, an output filter circuit and an output current steering circuit. The switching circuit is configured to receive and periodically switch an input current at an input dc voltage in accordance with alternating on and off states which define a duty cycle and in accordance therewith provide a switched current. The input current steering circuit, which is connected across the switching circuit, is configured to steer the input current by conducting the input current when the switching circuit is in the off state and in accordance therewith provide a steered current. The output filter circuit, which is connected to the switching circuit and connected and magnetically coupled to the input current steering circuit, is configured to receive and filter the switched current and in accordance therewith provide an output dc voltage which, in accordance with the duty cycle, is less than the input dc voltage. The output current steering circuit, which is connected to the input current steering circuit and connected across and magnetically coupled to the output filter circuit, is configured to further steer the steered current by conducting the steered current away from the output filter circuit.

These and other features and advantages of the present invention will be understood upon consideration of the following detailed description of the invention and the accompanying drawings.

DETAILED DESCRIPTION OF THE INVENTION

Figure 1:
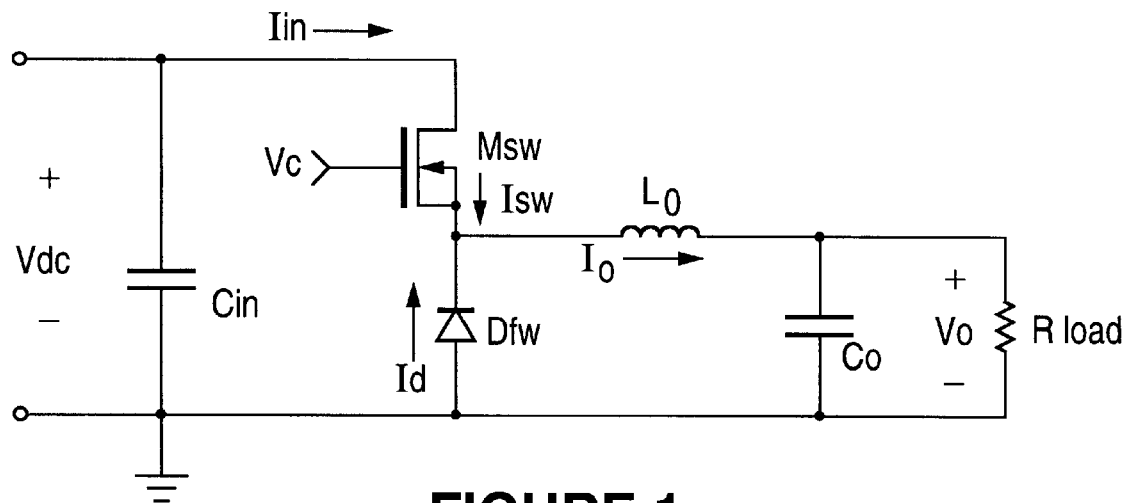
FIG. 1 is a schematic diagram of a conventional buck converter.
Figure 2:
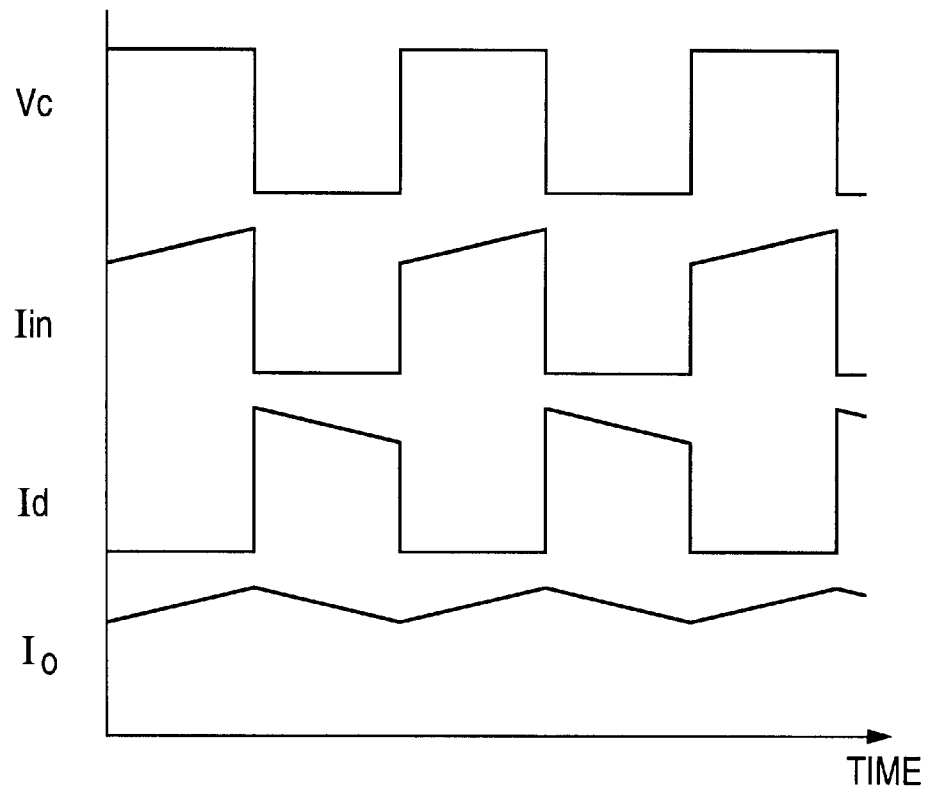
FIG. 2 illustrates voltage and current waveforms (not to scale) for the circuit of FIG. 1.
Figure 3:
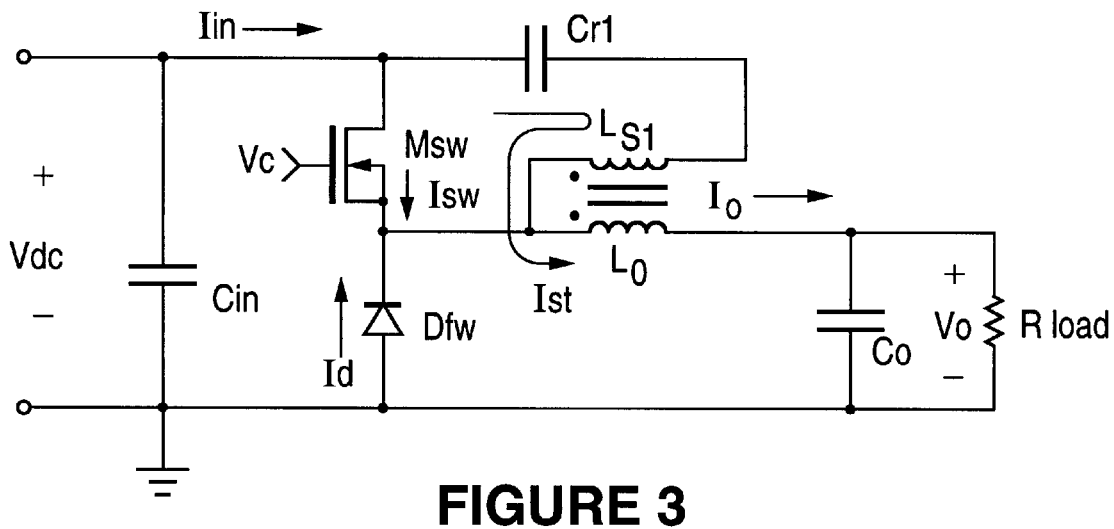
FIG. 3 is a schematic diagram of a buck converter with input current steering in accordance with one embodiment of the present invention.

Referring to FIG. 3, a buck converter with input steering in accordance with one embodiment of the present invention builds upon the conventional buck converter topology by adding input current steering in the form of a coupling capacitor Cr1 and a second inductor Ls1 which is magnetically coupled to the output inductor Lo. These components Cr1, Ls1 are connected in series across the switching transistor Msw. (It should be understood that a switching device other than a MOSFET can also be used as the switching transistor Msw, such as a bipolar junction transistor.)

During the on state of the switch Msw, the circuit operates in a substantially conventional manner by providing a switched current Isw via the switch Msw to the output which flows as the output current Io through the output filter inductor Lo. During the off state of the switch Msw, however, no switched current Isw flows through the switch Msw. Instead, the input current Iin is steered to the output inductor Lo by being conducted as a steered current Ist via the input current steering circuit Cr1, Ls1. This steered current Ist sums with the dc loop current Id flowing through the diode Dfw.

Figure 4:
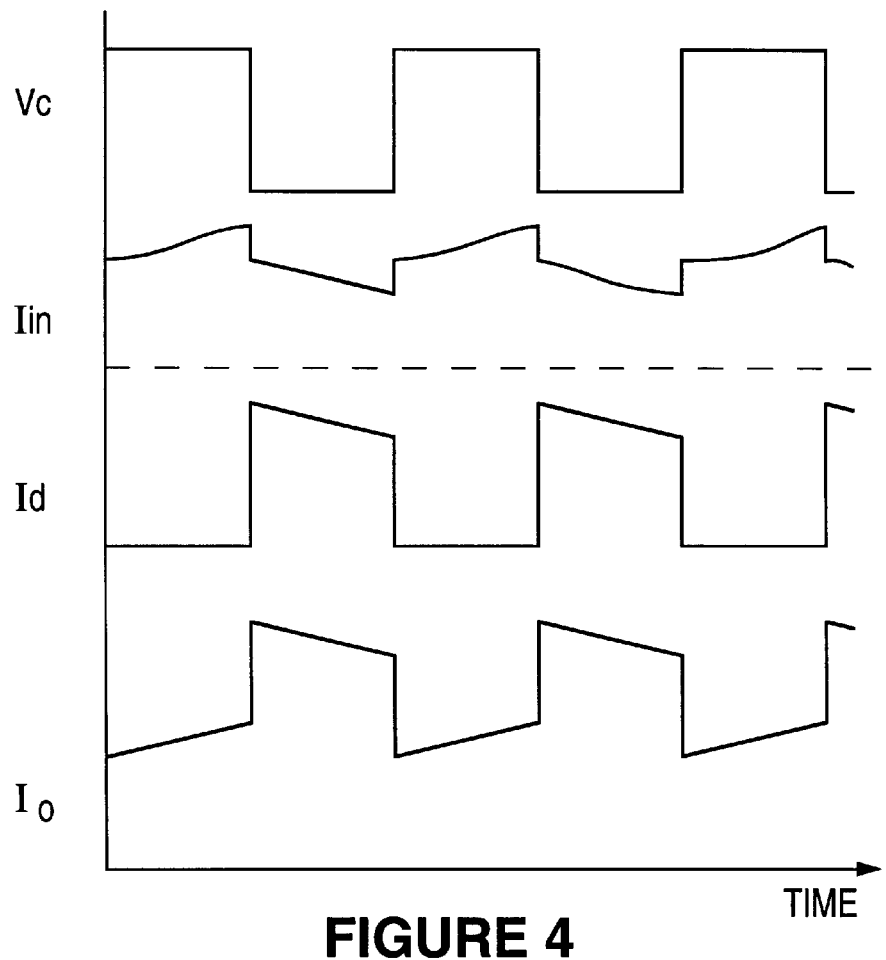
FIG. 4 illustrates voltage and current waveforms (not to scale) for the circuit of FIG. 3.

Referring to FIG. 4, this maintenance of current flow for the input current Iin during the off state of the switch Msw eliminates the pulsations in the input current Iin. The input current Iin now has a waveform with a significantly reduced peak-to-peak amplitude which is approaching a substantially sinusoidal shape, albeit with some slight discontinuities (which have been exaggerated here for purposes of illustration) due to secondary parasitic effects, and has, therefore, a substantially reduced harmonics content. Accordingly, EMI at the input terminals is significantly reduced.

However, due to the summing of the steered current Ist and loop current Id in the output circuit during the off state of the switch Msw, the output current Io is now pulsating, albeit without decreasing completely to a zero magnitude. Depending upon the equivalent series resistance (ESR) of the output filter capacitor Co, this increased peak-to-peak amplitude of the ripple in the output current Io may produce an excessive amount of ripple in the output voltage Vo.

Figure 5:
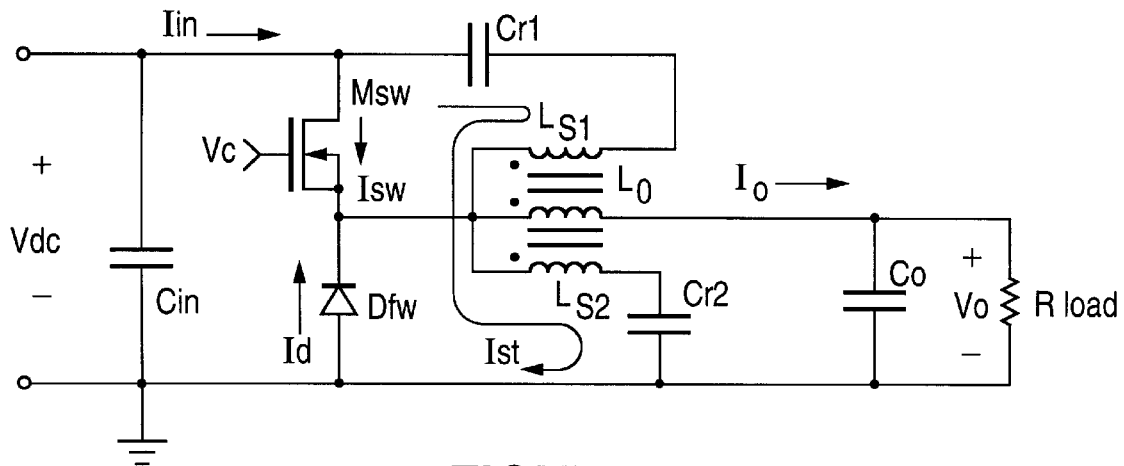
FIG. 5 is a schematic diagram of a buck converter with input and output current steering in accordance with another embodiment of the present invention.

Referring to FIG. 5, in addition to the input current steering circuit Cr1, Ls1, for eliminating input current Iin pulsations, an output current steering circuit Ls2, Cr2 can be added for removing the pulsations in the output current Io. This output current steering circuit includes an inductor Ls2 and capacitor Cr2 connected in series across the freewheeling diode Dfw. The inductor Ls2 is also magnetically coupled to the output filter inductor Lo.

During the on state of the switch Msw, this buck converter operates substantially as discussed above for the circuit of FIG. 3. However, due to the shunt connection of the output current steering circuit Ls2, Cr2 across the freewheeling diode Dfw, the steered current Ist no longer sums with the dc loop current Id flowing through the diode Dfw during the off state of the switch Msw. Instead, the steered current Ist is conducted away from the output inductor Lo and back to the source of the input voltage Vdc.

Figure 6:
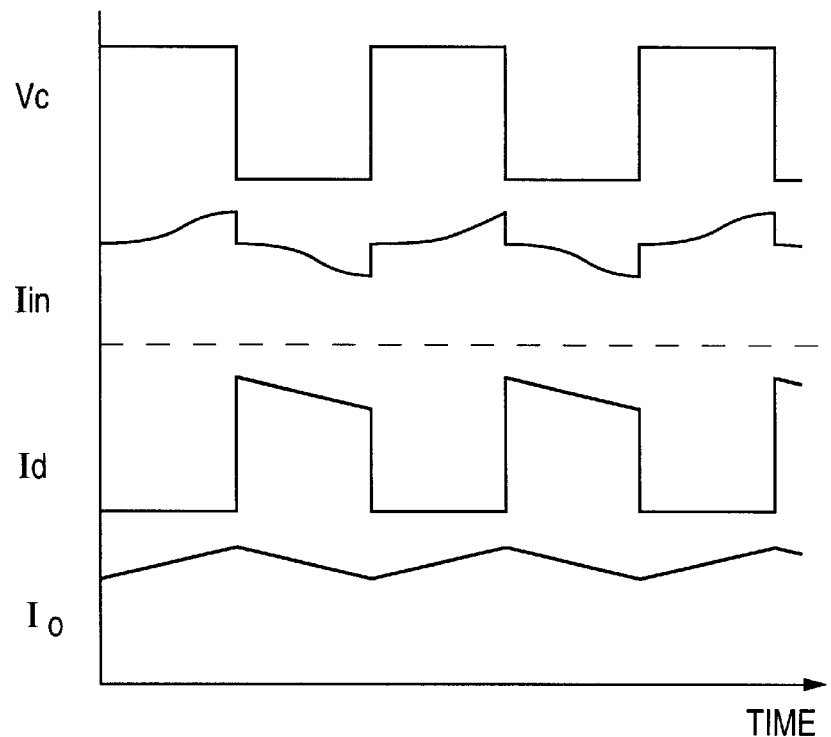
FIG. 6 illustrates voltage and current waveforms (not to scale) for the circuit of FIG. 5.

Referring to FIG. 6, the use of this output current steering circuit Ls2, Cr2 advantageously eliminates the pulsations in the output current Io introduced by the input current steering circuit Cr1, Ls1, thereby returning the waveform for the output current Io to its original shape. Accordingly, EMI at the input terminals has been significantly reduced without increasing EMI at the output terminals.

Figure 7:
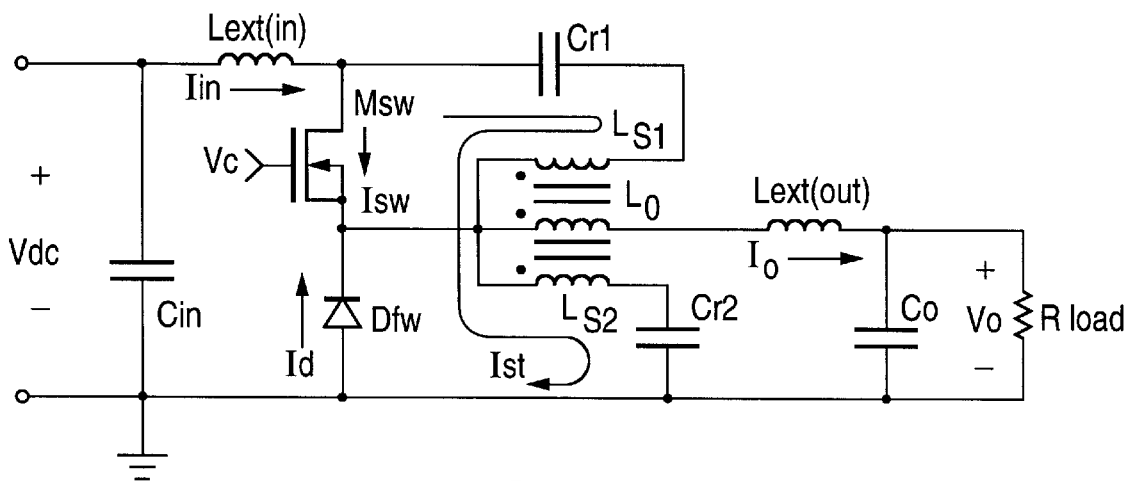
FIG. 7 is a schematic diagram of a buck converter with input and output current steering in accordance with still another embodiment of the present invention.
Figure 8:
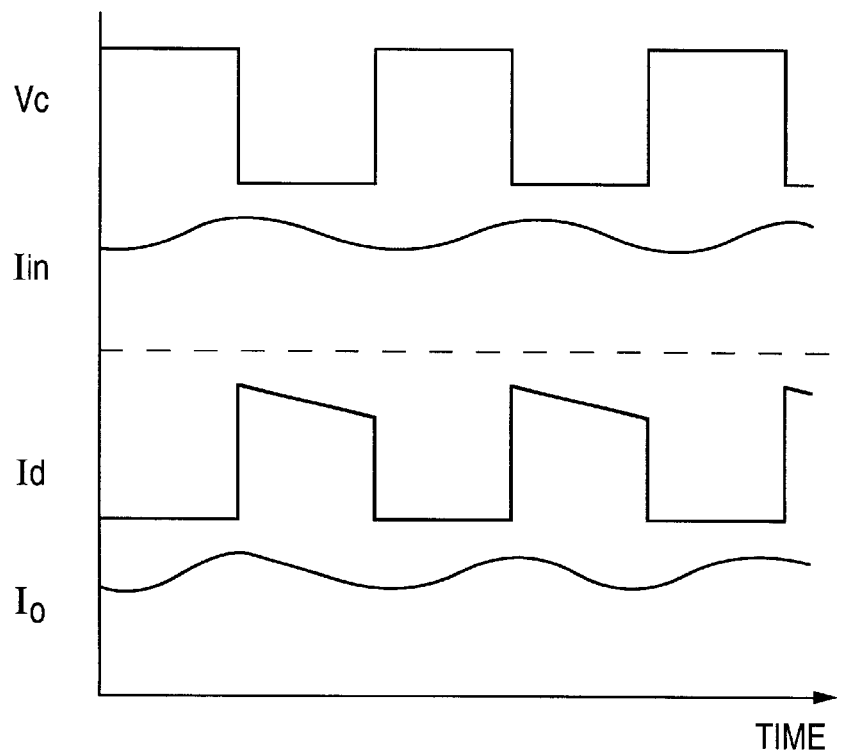
FIG. 8 illustrates voltage and current waveforms (not to scale) for the circuit of FIG. 7.

In regard to the output coupled inductors Lo, Ls1, Ls2, the preferred order of winding of such elements on a common core by which they are coupled is Ls1, Ls2 and Lo, respectively. When the primary winding Lo is wound loosely about the outside of the core, it is generally beneficial to supplement the output filter inductor Lo with an additional external inductance Lext(out) between the output inductor Lo and the output capacitor Co, as shown in FIG. 7. Further, an additional external inductance Lext(in) can be added on the input side between the input capacitor Cin and the drain terminal of the switching transistor Msw. Such additional external inductors Lext(in), Lext(out) would typically have approximately 1/20 to 1/10 of the inductance of the output inductor Lo and would further reduce the harmonic contents of the input current Iin and output current Io, thereby resulting in a significantly reduced ripple (peak-to-peak) in the input current Iin and the output current Io which are substantially sinusoidal in shape and are, therefore, substantially free of harmonics content.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a non-isolated buck converter with input current steering, comprising:
   a switching circuit configured to receive and periodically switch an input current at an input dc voltage in accordance with alternating on and off states which define a duty cycle and in accordance therewith provide a switched current;

an input current steering circuit, connected across said switching circuit, configured to steer said input current by conducting said input current when said switching circuit is in said off state and in accordance therewith provide a steered current; and an output filter circuit, connected to said switching circuit and connected and magnetically coupled to said input current steering circuit, configured to receive and filter said switched and steered currents and in accordance therewith provide an output dc voltage which, in accordance with said duty cycle, is less than said input dc voltage.

2. The apparatus of claim 1, wherein said switching circuit comprises a metal oxide semiconductor field effect transistor.

3. The apparatus of claim 1, wherein said input current steering circuit comprises a capacitor and an inductor connected in series.

4. The apparatus of claim 1, wherein said output filter circuit comprises a capacitor and at least one inductor connected in series.

5. An apparatus including a non-isolated buck converter with input and output current steering, comprising:

a switching circuit configured to receive and periodically switch an input current at an input dc voltage in accordance with alternating on and off states which define a duty cycle and in accordance therewith provide a switched current;

an input current steering circuit, connected across said switching circuit, configured to steer said input current by conducting said input current when said switching circuit is in said off state and in accordance therewith provide a steered current;

an output filter circuit, connected to said switching circuit and connected and magnetically coupled to said input current steering circuit, configured to receive and filter said switched current and in accordance therewith provide an output dc voltage which, in accordance with said duty cycle, is less than said input dc voltage; and an output current steering circuit, connected to said input current steering circuit and connected across and magnetically coupled to said output filter circuit, configured to further steer said steered current by conducting said steered current away from said output filter circuit.

6. The apparatus of claim 5, wherein said switching circuit comprises a metal oxide semiconductor field effect transistor.

7. The apparatus of claim 5, wherein said input current steering circuit comprises a capacitor and an inductor connected in series.

8. The apparatus of claim 5, wherein said output filter circuit comprises a capacitor and at least one inductor connected in series.

9. The apparatus of claim 5, wherein said output current steering circuit comprises a capacitor and an inductor connected in series.

* * * * *